US008531056B2

(12) United States Patent
Rahman et al.

(10) Patent No.: US 8,531,056 B2
(45) Date of Patent: Sep. 10, 2013

(54) LOW DROPOUT REGULATOR WITH MULTIPLEXED POWER SUPPLIES

(75) Inventors: Abidur Rahman, Allen, TX (US); Xiaochun Zhao, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 451 days.

(21) Appl. No.: 12/779,418

(22) Filed: May 13, 2010

(65) Prior Publication Data

US 2011/0278936 A1 Nov. 17, 2011

(51) Int. Cl.
*H02J 1/10* (2006.01)

(52) U.S. Cl.
USPC .......... 307/43

(58) Field of Classification Search
USPC .......... 307/43
See application file for complete search history.

(56) References Cited

U.S. PATENT DOCUMENTS

| | | | | |
|---|---|---|---|---|
| 6,097,113 | A * | 8/2000 | Teraoka et al. | 307/125 |
| 6,184,745 | B1 * | 2/2001 | Kim | 327/541 |
| 6,333,571 | B1 * | 12/2001 | Teraoka et al. | 307/125 |
| 7,782,123 | B2 * | 8/2010 | Nakajikkoku | 327/543 |
| 8,174,309 | B2 * | 5/2012 | Yoshino et al. | 327/541 |
| 2006/0001480 | A1 * | 1/2006 | Barkley et al. | 327/541 |
| 2009/0039947 | A1 | 2/2009 | Williams | |
| 2010/0052775 | A1 * | 3/2010 | Mizuno et al. | 327/541 |

* cited by examiner

*Primary Examiner* — Rexford Barnie
*Assistant Examiner* — Dru Parries
(74) *Attorney, Agent, or Firm* — Alan A. R. Cooper; Wade J. Brady, III; Frederick J. Telecky, Jr.

(57) ABSTRACT

Generally, with low drop out (LDO) regulators that use multiplexed power supplies, the transistors within the regulator can use a substantial amount of area. Here, a regulator is provided that uses a multiplexer to commonly control the back-gates of multiple power transistors within the LDO. By doing this, the area overhead that would normally be present with these switches (of the multiplexer) can be dramatically reduced without sacrificing performance.

7 Claims, 2 Drawing Sheets

LOW DROPOUT REGULATOR WITH MULTIPLEXED POWER SUPPLIES

TECHNICAL FIELD

The invention relates generally to low dropout (LDO) regulators and, more particularly, to LDOs with multiple power supplies.

BACKGROUND

Referring to FIG. 1 of the drawings, the reference numeral 100 generally designates a conventional regulator having a multiplexed power supply. The regulator 100 generally comprises switches 102 and 104, and an LDO 106. Each of the switches 102 and 104 generally have a pair of back-to-back PMOS transistors Q1/Q2 and Q3/Q4, which are coupled together at their respective sources and bodies and which are controlled by control signals SEL1 and SEL2, respectively. LDO 106 generally comprises an amplifier 108, a buffer 110, and a PMOS transistor Q5.

In many applications, it is desirable to be able to select between various power supplies, which can supply different currents (i.e., 75 mA and 500 mA). Here, control signals SEL1 or SEL2 can be asserted to provide voltage V1 or V2, respectively, to the source of transistor Q5. A problem with configuration, however, is that if one of the switches 102 or 104 provides a large current (i.e., 500 mA), the switch 102 or 104 is very large to avoid a significant voltage drop across the switch 102 or 104 because of headroom requirements for some applications.

Turning to FIG. 2, an alternative regulator 200 can be seen. Regulator 200 is similar to regulator 100, but, here, switch 102 has been removed. A regulated input voltage REG from an external supply (which is filtered by capacitor C) is also applied to the node between the LDO 106 and switch 104. In this configuration, switch 104 is switched "on" (i.e., control signal SEL1 is asserted) when the external supply does not provide power to the LDO 106. A drawback, however, for regulator 200 is that use of capacitor C generally violates a sequence requirement since the voltage REG is supplied by another regulator. For example, an application may require that the voltage REG remain logic low or "0" when switch 104 is in an "on" state, which means that regulator 200 would violate this requirement.

Therefore, there is a need for an improved regulator.

Another example of a convention circuit is U.S. Patent Pre-Grant Publ. No. 2009/0039947.

SUMMARY

A preferred embodiment of the present invention, accordingly, provides an apparatus. The apparatus comprises a plurality of power supply terminals; an output terminal; a supply node; a plurality of switches, wherein each switch is coupled to at least one of the power supply terminals, and wherein each switch is coupled to the supply node, and wherein each switch is controlled by at least one of a plurality of control signals; a plurality of power transistors, wherein each power transistor has a body electrode, a first passive electrode, a second passive electrode, and a control electrode, and wherein each power transistor is coupled to the supply node at its body electrode, and wherein the first passive electrode of each power transistor is coupled to at least one of the power supply terminals, and wherein the second passive electrode of each power transistor is coupled to the output terminal; a plurality of buffers, wherein each buffer is coupled to the control electrode of at least one of the power transistors; and an amplifier that is coupled to each buffer.

In accordance with a preferred embodiment of the present invention, each switch further comprises a pair of back-to-back PMOS transistors.

In accordance with a preferred embodiment of the present invention, each of the power transistors further comprises a PMOS transistor.

In accordance with a preferred embodiment of the present invention, an apparatus is provided. The apparatus comprises a first power supply terminal; a second power supply terminal; an output terminal; a supply node; a first switch that is coupled between the first power supply terminal and the supply node; a second switch that is coupled between the second power supply terminal and the supply node; a first power transistor having a body electrode, a first passive electrode, a second passive electrode, and a control electrode, wherein the supply node is coupled to the first power transistor at its body electrode, and wherein the first power transistor is coupled to the first power supply terminal at its first passive electrode, and wherein the first power transistor is coupled to the output terminal at its second passive electrode; a second power transistor having a body electrode, a first passive electrode, a second passive electrode, and a control electrode, wherein the supply node is coupled to the first power transistor at its body electrode, and wherein the first power transistor is coupled to the first power supply terminal at its first passive electrode, and wherein the first power transistor is coupled to the output terminal at its second passive electrode; a first buffer that is coupled to the first power transistor at its control electrode; a second buffer that is coupled to the first power transistor at its control electrode; and an amplifier that is coupled to each buffer.

In accordance with a preferred embodiment of the present invention, the first and second power transistors further comprises first and second PMOS transistors, respectively.

In accordance with a preferred embodiment of the present invention, the first switch further comprises: a third PMOS transistor that is coupled to the first power supply terminal at its drain, wherein the body and source of the third PMOS transistor are coupled together; and a fourth PMOS transistor that is coupled to the source of the third PMOS transistor at its body and source and that is coupled to the supply node at its drain.

In accordance with a preferred embodiment of the present invention, the second switch further comprises: a fifth PMOS transistor that is coupled to the second power supply terminal at its drain, wherein the body and source of the fifth PMOS transistor are coupled together; and a sixth PMOS transistor that is coupled to the source of the fifth PMOS transistor at its body and source and that is coupled to the supply node at its drain.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
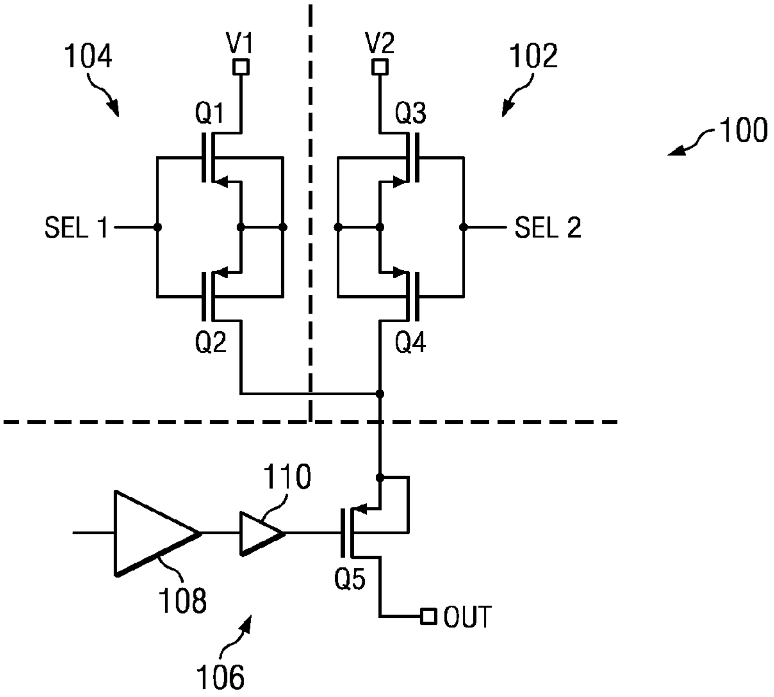
FIG. 1 (PRIOR ART)
FIGS. 1 and 2 are circuit diagrams of examples of conventional regulators.
Figure 2:
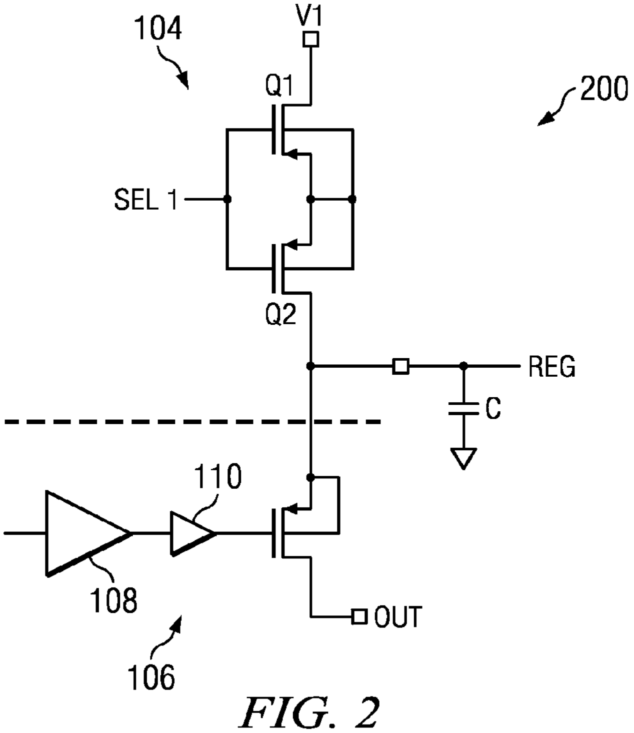
FIG. 2 (PRIOR ART)

Refer now to the drawings wherein depicted elements are, for the sake of clarity, not necessarily shown to scale and wherein like or similar elements are designated by the same reference numeral through the several views.

Figure 3:
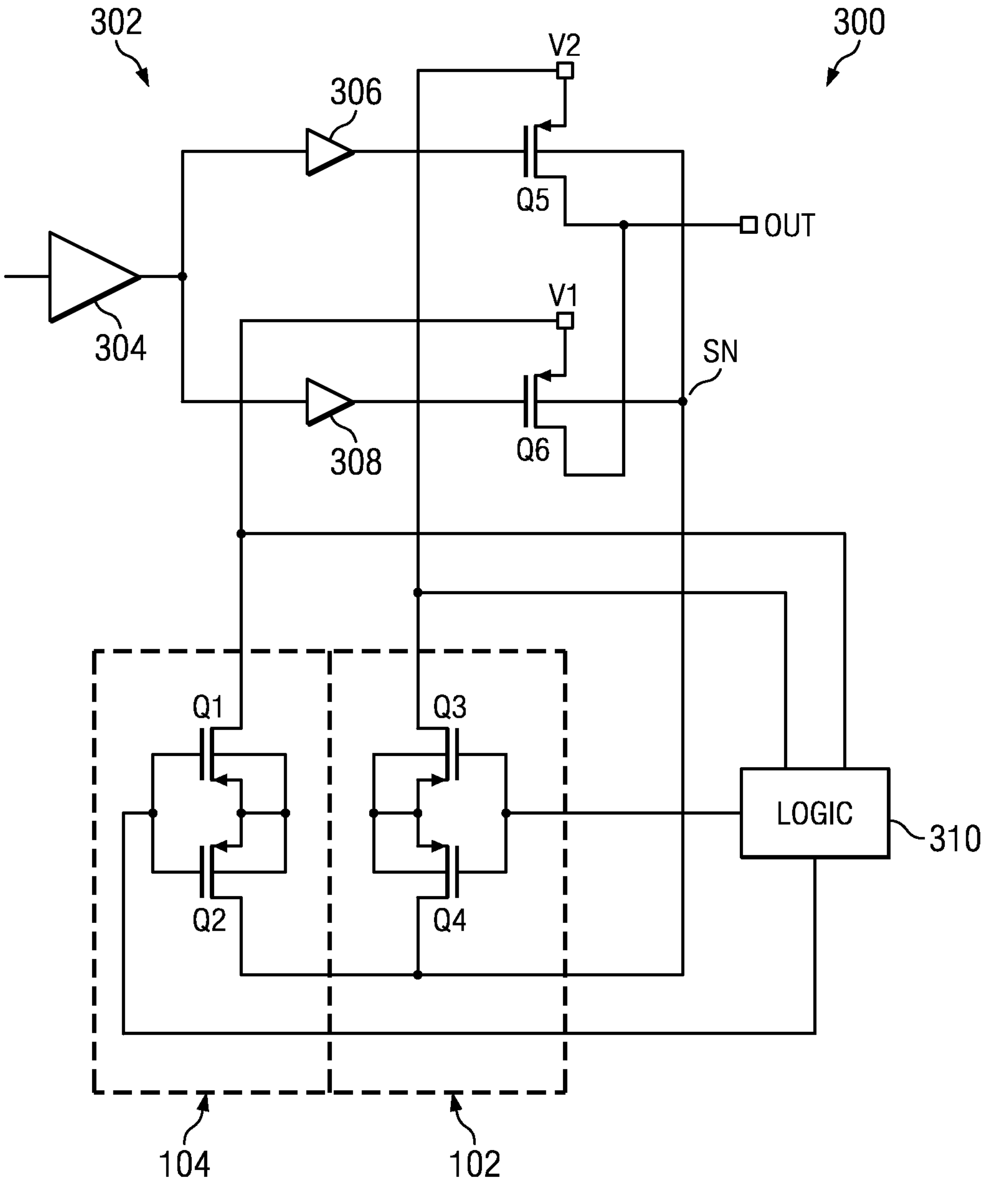
FIG. 3 is a circuit diagram of a regulator in accordance with a preferred embodiment of the present invention.

Turning to FIG. 3, a regulator 300 in accordance with a preferred embodiment of the present invention can be seen. Regulator 300 generally comprises an LDO 302 and switches 102 and 104. LDO 302 generally comprises amplifier 304, buffers 306 and 308, power transistors Q5 and Q6, and logic 310.

In operation, power transistors Q5 and Q6 (which are typically PMOS transistors) are employed to directly supply power from input terminals to the output terminal. Generally, transistors Q5 and Q6 are sized to carry a desired current from its respective power source (which provides voltages V1 and V2). Each of these transistors Q5 and Q6 is driven by its separate, respective buffer 306 and 308, with each buffer being commonly coupled to amplifier 304. A significant difference between regulators 100 and 200 and regulator 300 is that the back-gates or bodies of transistors Q5 and Q6 are coupled together at a supply node SN. Switches 102 and 104 are then coupled generally in parallel to one another to this supply nodes SN from their respective supplies (which provide voltages V1 and V2), allowing switches 102 and 104 to operate as a multiplexer. The control signals are provided to switches 102 and 104 from logic 310 based on the relative voltage levels of voltages V1 and V2.

Preferably, logic 310 through switches 102 or 104 provides the larger of voltages V1 and V2 to the back-gates of transistors Q5 and Q6. For example, if voltage V2 is larger than voltage V1, switch 102 would be enabled so as to provide voltage V2 to the back-gates of transistors Q5 and Q6. Applying the largest of voltages V1 and V2 to the back-gates of transistors Q5 and Q6 has the effect of coupled the body of the transistors Q5 or Q6 associated with the largest voltage V1 or V2 to its source, while increasing the threshold voltage for the other transistor Q5 or Q6. Effectively, this allows the size of switches 102 and 104 to be very small because the current flowing through the back-gate of the "off" transistors Q5 or Q6 would be close to 0. Additionally, to further reduce area, switches 102 and 104 can be replaced with a single PMOS or NMOS transistor; however, the selection logic would generally be more complicated. To further illustrate the different in area between regulators 100, 200, and 300, Table 1 is provided below.

TABLE 1

| | Output MOS area | Switch Area | Total area (um^2) |
|---|---|---|---|
| Regulator 300 | 240 * 100/0.4 | 32 × 10/0.4 | 9,728 |
| Regulator 100 | 210 * 100/0.4 | 1150 × 100/0.4 | 54,400 |
| Regulator 200 | 210 * 100/0.4 | 150 × 100/0.4 | 14,400 |

As can be clearly seen, regulator 300 provides a significant reduction in area compared to regulators 100 and 200.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:

a plurality of power supply terminals;

an output terminal;

a supply node;

a plurality of switches, wherein each switch is directly coupled to at least one of the power supply terminals, and wherein each switch is directly coupled to the supply node, and wherein each switch is controlled by at least one of a plurality of control signals;

a plurality of power transistors, wherein each power transistor has a body electrode, a first passive electrode, a second passive electrode, and a control electrode, and wherein each power transistor is directly coupled to the supply node at its body electrode, and wherein the first passive electrode of each power transistor is directly coupled to at least one of the power supply terminals, and wherein the second passive electrode of each power transistor is directly coupled to the output terminal;

a plurality of buffers, wherein each buffer is directly coupled to the control electrode of at least one of the power transistors; and an amplifier that is directly coupled to each buffer.

2. The apparatus of claim 1, wherein each switch further comprises a pair of back-to-back PMOS transistors.

3. The apparatus of claim 2, wherein each of the power transistors further comprises a PMOS transistor.

4. An apparatus comprising:

a first power supply terminal;

a second power supply terminal;

an output terminal;

a supply node;

a first switch that is coupled between the first power supply terminal and the supply node;

a second switch that is coupled between the second power supply terminal and the supply node;

a first power transistor having a body electrode, a first passive electrode, a second passive electrode, and a control electrode, wherein the supply node is coupled to the first power transistor at its body electrode, and wherein the first power transistor is coupled to the first power supply terminal at its first passive electrode, and wherein the first power transistor is coupled to the output terminal at its second passive electrode;

a second power transistor having a body electrode, a first passive electrode, a second passive electrode, and a control electrode, wherein the supply node is coupled to the second power transistor at its body electrode, and wherein the second power transistor is coupled to the second power supply terminal at its first passive electrode, and wherein the second power transistor is coupled to the output terminal at its second passive electrode;

a first buffer that is coupled to the first power transistor at its control electrode;

a second buffer that is coupled to the first power transistor at its control electrode; and an amplifier that is coupled to each buffer.

5. The apparatus of claim 4, wherein the first and second power transistors further comprises first and second PMOS transistors, respectively.

6. The apparatus of claim 5, wherein the first switch further comprises:

a third PMOS transistor that is coupled to the first power supply terminal at its drain, wherein the body and source of the third PMOS transistor are coupled together; and a fourth PMOS transistor that is coupled to the source of the third PMOS transistor at its body and source and that is coupled to the supply node at its drain.

7. The apparatus of claim 6, wherein the second switch further comprises:

a fifth PMOS transistor that is coupled to the second power supply terminal at its drain, wherein the body and source of the fifth PMOS transistor are coupled together; and a sixth PMOS transistor that is coupled to the source of the fifth PMOS transistor at its body and source and that is coupled to the supply node at its drain.

* * * * *